(12) United States Patent
Qu et al.

(10) Patent No.: US 11,582,099 B1
(45) Date of Patent: Feb. 14, 2023

(54) PREDICTIVE PIPELINE ANALYTICS FOR A NETWORK MANAGEMENT SYSTEM

(71) Applicant: Juniper Networks, Inc., Sunnyvale, CA (US)

(72) Inventors: Diheng Qu, Palo Alto, CA (US); Atul Bhaskarrao Patil, San Ramon, CA (US); Ilia Kharin, Saratov (NL); J P Senior, Calgary (CA)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 17/657,519

(22) Filed: Mar. 31, 2022

(51) Int. Cl.
G06F 15/177 (2006.01)
H04L 41/0816 (2022.01)
H04L 41/0853 (2022.01)
H04L 41/12 (2022.01)

(52) U.S. Cl.
CPC ...... H04L 41/0816 (2013.01); H04L 41/0853 (2013.01); H04L 41/12 (2013.01)

(58) Field of Classification Search
CPC .. H04L 41/0853; H04L 41/0816; H04L 41/12
USPC ........................................................ 709/220
See application file for complete search history.

(56) References Cited

U.S. PATENT DOCUMENTS

| | | | |
|---|---|---|---|
| 10,200,248 B1 | 2/2019 | Jiang et al. | |
| 10,313,206 B1 | 6/2019 | Karam et al. | |
| 10,516,761 B1 | 12/2019 | A et al. | |
| 10,992,543 B1* | 4/2021 | Rachamadugu | H04L 43/04 |
| 10,999,410 B1 | 5/2021 | A et al. | |
| 2013/0191688 A1* | 7/2013 | Agarwal | H04L 41/0873 714/E11.178 |
| 2018/0210927 A1* | 7/2018 | Karam | G06F 16/9024 |
| 2018/0359172 A1* | 12/2018 | Yadav | H04L 45/70 |

(Continued)

FOREIGN PATENT DOCUMENTS

| | | |
|---|---|---|
| EP | 3522452 A1 | 8/2019 |
| WO | 2004090672 A2 | 10/2004 |

OTHER PUBLICATIONS

"EVPN Probes," Juniper Apstra 3.3.0 Documentation, Nov. 10, 2021, Retrieved from the Internet: URL: https://www.juniper.net/documentation/us/en/software/apstra/apstra3.3.0/probe_evpn.html, 7 pp.

(Continued)

*Primary Examiner* — Hee Soo Kim
(74) *Attorney, Agent, or Firm* — Shumaker & Sieffert, P.A.

(57) ABSTRACT

A controller device includes a memory and one or more processors coupled to the memory. The memory stores instructions that, when executed, cause the one or more processors to receive a query indicating a first time and a network service, determine a first set of configuration elements using telemetry data associated with the first time and the network service, and determine a second set of configuration elements using an intent model. The instructions further cause the one or more processors to determine one or more first metrics that occur at the first time using the first set of configuration elements and the second set of configuration elements, determine one or more second metrics at a second time using telemetry data received from the plurality of network devices, and generate data representing a user interface presenting the one or more first metrics and the one or more second metrics.

20 Claims, 7 Drawing Sheets

(56) References Cited

U.S. PATENT DOCUMENTS

| | | | |
|---|---|---|---|
| 2019/0149440 A1* | 5/2019 | Rantzau | H04L 43/062 370/241 |
| 2019/0182119 A1* | 6/2019 | Ratkovic | H04L 41/145 |
| 2019/0238423 A1 | 8/2019 | Karam et al. | |
| 2020/0351173 A1* | 11/2020 | Vasseur | H04L 41/0681 |
| 2021/0160158 A1* | 5/2021 | Chintala | G06F 11/328 |
| 2022/0263708 A1* | 8/2022 | Ramachandran | H04L 45/38 |

OTHER PUBLICATIONS

Bjorklund, "YANG—A Data Modeling Language for the Network Configuration Protocol (NETCONF)," Internet Engineering Task Force (IETF), RFC 6020, Oct. 2010, 173 pp.
Enns, "NETCONF Configuration Protocol," Network Working Group, RFC 4741, Dec. 2006, 95 pp.
Harrington et al., "An Architecture for Describing Simple Network Management Protocol (SNMP) Management Frameworks," Network Working Group, RFC 3411, Dec. 2002, 64 pp.
Extended Search Report from counterpart European Application No. 22179250.0 dated Nov. 25, 2022, 10 pp.
Juniper Apstra, "Apstra Documentation Release 3.3.0", Chapter 5.2 Telemetry, Jun. 2021, pp. 85-316, https://www.juniper.net/documentation/us/en/software/apstra/apstra3.3.0/_static/Apstra_33_Docs.pdf.

* cited by examiner

PREDICTIVE PIPELINE ANALYTICS FOR A NETWORK MANAGEMENT SYSTEM

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques for a identifying relevant telemetry information for managing network devices. A network management system (NMS) device, also referred herein as a controller or controller device, may be configured to translate high-level configuration (e.g., intents received from an administrator for a plurality of managed network devices) to low-level configuration (e.g., to be applied to the managed network devices themselves). In some instances, the controller device may receive an indication of a topology and a role for a resource device and generate device-level configuration information for the resource device. For example, an administrator (e.g., a human being) may select a topology (e.g., spine or leaf, 3-stage Clos, or 5-stage Clos) and role for the resource device and provide an intent. In some examples, the controller device may generate device-level configuration for the resource device based on the role of the resource device, the topology, and the intent.

In one example, a method of managing a plurality of network devices includes receiving, by one or more processors of a device that manages the plurality of network devices, a query indicating a first time and a network service and determining, by the one or more processors, a first set of configuration elements of the plurality of network devices using telemetry data received from the plurality of network devices and associated with the first time and the network service. The method further includes determining, by the one or more processors, a second set of configuration elements of the plurality of network devices using an intent model and determining, by the one or more processors, one or more first metrics that occur at the first time using the first set of configuration elements and the second set of configuration elements. The method further includes determining, by the one or more processors, one or more second metrics at a second time using telemetry data received from the plurality of network devices and generating, by the one or more processors, data representing a user interface presenting the one or more first metrics and the one or more second metrics. The method further includes outputting, by the one or more processors, the data representing the user interface.

In another example, a controller device includes a memory and one or more processors coupled to the memory. The memory stores instructions that, when executed, cause the one or more processors to receive a query indicating a first time and a network service and determine a first set of configuration elements of a plurality of network devices using telemetry data received from the plurality of network devices and associated with the first time and the network service. The instructions further cause the one or more processors to determine a second set of configuration elements of the plurality of network devices using an intent model and determine one or more first metrics that occur at the first time using the first set of configuration elements and the second set of configuration elements. The instructions further cause the one or more processors to determine one or more second metrics at a second time using telemetry data received from the plurality of network devices and generate data representing a user interface presenting the one or more first metrics and the one or more second metrics. The instructions further cause the one or more processors to output the data representing the user interface.

1. In one example, a computer-readable storage medium having stored thereon instructions that, when executed, cause a processor of a controller device that manages a plurality of network devices to receive a query indicating a first time and a network service and determine a first set of configuration elements of the plurality of network devices using telemetry data received from the plurality of network devices and associated with the first time and the network service. The instructions further cause the processor to determine a second set of configuration elements of the plurality of network devices using an intent model and determine one or more first metrics that occur at the first time using the first set of configuration elements and the second set of configuration elements. The instructions further cause the processor to determine one or more second metrics at a second time using telemetry data received from the plurality of network devices and generate data representing a user interface presenting the one or more first metrics and the one or more second metrics. The instructions further cause the processor to output the data representing the user interface.

The details of one or more examples are set forth in the accompanying drawings and the description below. Other features, objects, and advantages will be apparent from the description and drawings, and from the claims.

DETAILED DESCRIPTION

Figure 1:
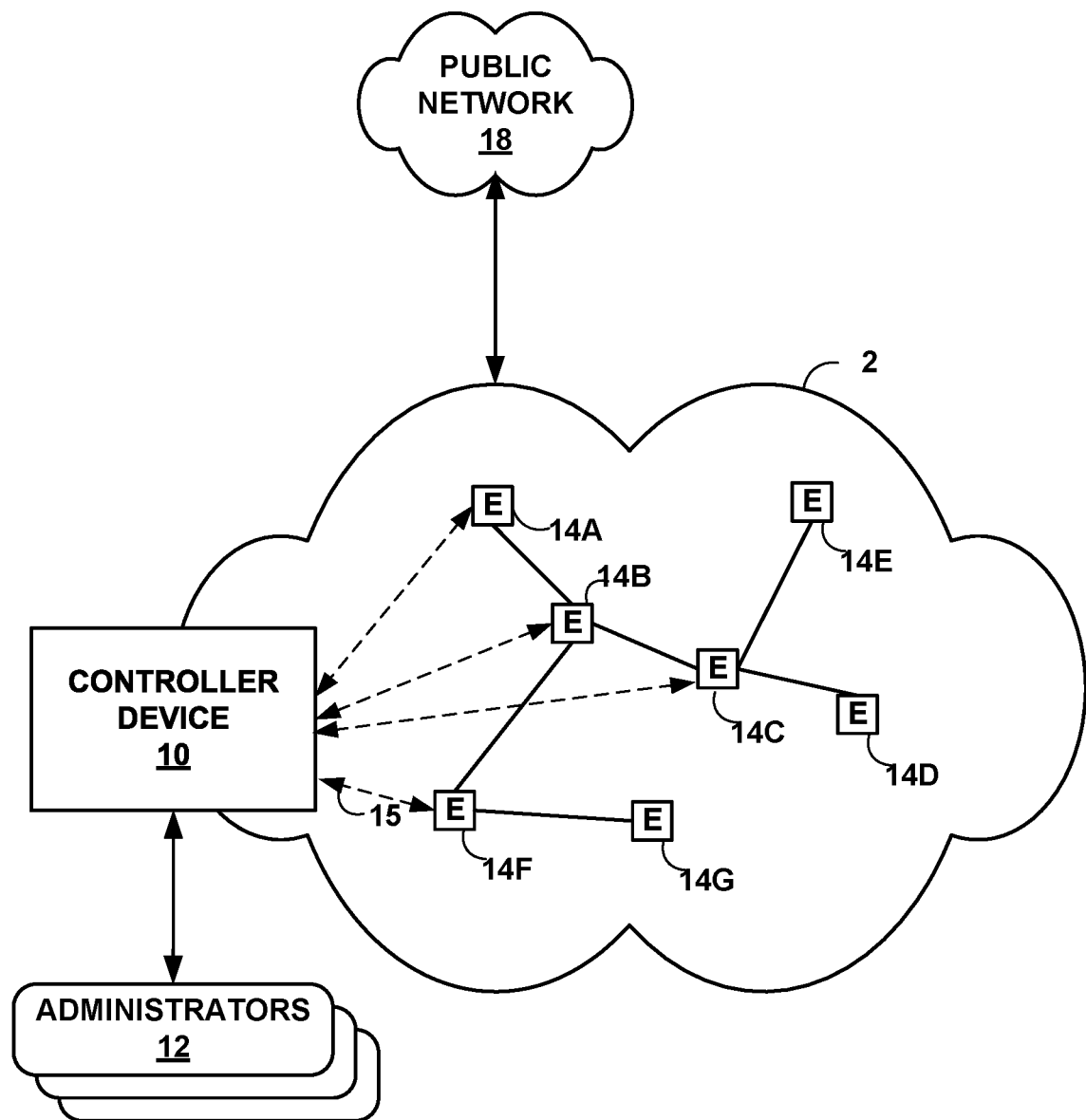
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10 may comprise, for example, a cluster of virtual machines. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

A user configuration of devices may be referred to as "intents." An intent-based networking system may help to allow administrators to describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When intents are modeled using a unified graph model, extending new intent support needs to extend the graph model and compilation logic.

Controller device 10 may be configured to accept high-level configuration data, or intents, from administrator 12 (which may be expressed as structured input parameters, e.g., according to YANG, which is described in Bjorklund, "YANG—A Data Modeling Language for the Network Configuration Protocol (NETCONF)," Internet Engineering Task Force, RFC 6020, Oct. 2010, available at tools.ietf.org/html/rfc6020).

In order to configure devices to perform the intents, a user (such as an administrator 12) may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller device 10 may also be configured to output respective sets of low-level device configuration data, e.g., device configuration additions, modifications, and removals. Additional details regarding an example process for translating high-level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high-level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks and intents are declarative. To realize intents, controller device 10 may attempt to select optimal resources from elements 14 and/or from other devices.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

For example, controller device 10 may receive an intent from administrator 12. In this example, controller device 10 may determine an intent model (e.g., an intent graph model) using the intent from administrator 12. The intent received from administrator 12 may include, for example, a set of requirements that includes a specification of an intent that identifies a desired service and an associated reference design to be used to implement the intent. The reference design may identify a standard manner in which component systems and devices are to be organized to provide a service. For example, the reference design may identify a network topology and protocol(s) to be utilized to provide an intended network service. The intent may specify one or more requirements (e.g., declarative network requirements) of the desired service independent of the reference design to be utilized. For example, the intent may specify that 20 elements of elements 14 are to be networked together. By separating the specification of the intent and the reference design, different reference design implementations of the intent may be achieved by simply specifying different reference designs along with the same intent. The set of requirements may include a set of declarative requirements. For example, declarative requirements may express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, administrator 12 may be relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of network 2 may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

For example, controller device 10 may cause elements 14 to implement the network service using the graph model. For example, controller device 10 may generate high-level instructions for elements 14. In some instances, controller device 10 may output the high-level instructions to each element of elements 14. Additionally, or alternatively, controller device 10 may determine respective low-level instructions for one or more elements of elements 14 from the high-level instructions and output the respective low-level instructions to each element of the one or more elements of elements 14.

The techniques of this disclosure provide a mechanism that may reduce an amount of metrics (e.g., interface traffic, transceiver load, transceiver power, etc.) to display to a network administrator in response to a query for an event (e.g., a service outage at a particular time that occurred in the past) identified by a customer. For example, in response to a query for an event at a particular time, there may be many metrics for millions of routes of a virtual network. Some systems may rely on a network administrator to review available metrics that are closest to the time of the event to manually identify relevant metrics.

Techniques described herein include configuring a controller device to identify relevant network configuration metrics (e.g., interface traffic, transceiver load, transceiver power, etc.) for an event (e.g., a service outage at a particular time) based on an intent model. For example, controller device 10 may intelligently identify a subset of routes that administrator 12 is most likely to be interested in for a particular time and network service and what the status of the subset of routes should be to help to identify expected routes, non-expected extra routes, and missing routes and deduce if those routes are properly installed, missing or overridden by wrong routes on a network device. Controller device 10 may present a user interface that displays the relevant metrics to the user. In this way, controller device 10 may identify metrics that are most likely to be relevant to administrator 12, which may help to reduce an amount of time that administrator 12 reviews metrics in response to an event (e.g., a network service event).

In some examples, techniques described herein may be applied to provide "root cause analysis." When applying root cause analysis, controller device 10 may determine how a problem in one software or hardware component of a network (e.g., an interface or a route in a route table) would impact (or propagate to) another component in other software or hardware components of network 2. For example, a missing route on element 14A may cause element 14A to fail to establish a border gateway protocol (BGP) session with element 14B, which in turn may cause both elements 14A and 14B to fail to exchange routes for a virtual network, which in turn can cause services deployed inside this virtual network to be interrupted, which corresponds to a service outage event that administrator 12 is trying to troubleshoot.

Techniques described herein may use time series data collection techniques that non-periodically store event driven data based on the intent model, which may reduce an amount of data stored by controller device 10 and/or improve an accuracy of metrics stored for a particular time. In this example, controller device 10 may "replay" metrics at a particular time in the past. For example, controller device 10 may be configured to snapshot telemetry data differently for periodic data (e.g., an interface counter) and event driven data (e.g., interface up/down). Examples of periodic data may include how many bytes have been transmitted and how many errors occurred for an interface. A sensor device (e.g., arranged at an element of elements 14 or arranged outside of elements 14) may generate periodic data periodically (e.g., every five seconds or every minute). In this example, the sensor device may stream the periodic data to the controller device. Examples of event driven data may include whether an interface is up or down, a failure, a disk input-output (TO) failure, route information, or network failure. For event driven data, controller device 10 may store the event driven data in response to a change of the event driven data. For example, if the interface has been up for very, very long time the controller device may not log an event. In this example, controller device 10 may log an event when the interface changes from up to down.

In accordance with the techniques of the disclosure, controller device 10 may be configured to identify relevant network configuration metrics (e.g., interface traffic, transceiver load, transceiver power, etc.) for an event (e.g., a service outage at a particular time) based on an intent model. For example, controller device 10 may intelligently identify a subset of routes that a network administrator is most likely to be interested in for a particular time and network service and what the status of the subset of routes and may provide a metric (e.g., a state) for each route of the subset of routes. Controller device 10 may identify expected routes, non-expected extra routes, and missing routes. In some examples, controller device 10 may deduce if those routes are properly installed, missing or overridden by wrong routes on an element of elements 14. Controller device 10 may present a user interface that displays the relevant metrics to administrator 12. In this way, controller device 10 may identify metrics that are most likely to be relevant to the network administrator, which may help to reduce an amount of time that administrator 12 reviews metrics in response to an event (e.g., a network service event for network 2). While the above example is directed to routes, other examples may additionally or alternatively include other configuration elements, such as, for example, interfaces or flows.

For example, controller device 10 may receive a query indicating a time and a network service from administrator 12. An example query follows.
URL: https://10.28.102.3/api/blueprints/13_clos_template 0/probes/97a1652d-d0df-4012-8e5d-5d37efd87353/ query?page=2&per_page=25

Query Payload:
{
  "stage":"VXLAN Flood List Table",
  "filter": "[system_id, virtual network] in [[\"OEB460F50000\",\"10000\"],[ . . . ]]",
  "order by":"properties.system_id:ASC;properties.endpoint:ASC;properties.next hop: ASC;properties.vni:ASC",
  "begin_time": "2022-03-24T00:00:00.000Z",
  "end_time": "2022-03-25 TOO:00:00.000Z" }

Meaning of Fields:
Blueprint and probe names are encoded in query URL
"stage": a stage inside an analytics pipeline. the name is used to identify metrics generated from the stage
"filter": select interested data set.
"order_by": how the result should be sorted for easier parsing and presentation by the caller
"begin_time": beginning of a time window
"end_time": end of the window.
Response includes a snapshot of selected metrics at "begin_time", and time series data between begin_time and end_time.

Controller device 10 may determine a first set of configuration elements for the query using telemetry data associated with the time and the network service. As used herein, telemetry data associated with a time and a network service may refer to data collected by one or more sensor devices for network devices 14 during a time range that includes the time, where the sensor devices monitor software components and/or hardware components implementing the network service during the time range. For example, controller device 10 may determine a first subset of routes impacted by the network service at the time from all routes of network 2. For instance, controller device 10 may determine, using telemetry data received from elements 14, a first subset of routes impacted by the network service at the time from all routes of network 2. In some examples, controller device 10 may determine a first subset of interfaces impacted by the network service at the time from all interfaces of network 2. For instance, controller device 10 may determine, using telemetry data received from elements 14, a first subset of interfaces impacted by the network service at the time from all interfaces of network 2.

Controller device 10 may determine a second set of configuration elements for the query using an intent model. For example, controller device 10 may determine an intent model using an intent received from administrator 12. As discussed in detail above, controller device 10 may have configured elements 14 using the intent model. For instance, controller device 10 may determine, using the intent model, a second subset of routes from all routes of network 2. In some instances, controller device 10 may determine, using the intent model, a second subset of interfaces from all interfaces of network 2.

Controller device 10 may identify the intent in a hierarchical way. For example, controller device 10 may identify an intent by a blueprint, which may be associated with a data center of multiple data centers to query. Next, controller device 10 may apply a probe, which defines a sub-graph of the blueprint, e.g. virtual network related node/relationships from the blueprint. Applying the probe may also cause controller device 10 to specify which aspect of the sub-graph is being monitored, e.g. vxlan active floodlist routing table. Moreover, applying the probe may also cause controller device 10 to define an analytics pipeline. The analytics pipeline may include multiple stages, e.g. a first stage may keep track of all routes reported by network devices, a second stage may calculate missing/extra routes per device per virtual network, and a third stage compares missing routes to user defined threshold, and raises anomalies as needed, etc. As such, controller device 10 may store time series data on a file system mirroring the same structure as the intent. For example, controller device 10 may store a top level directory named after the blueprint, then a sub directory named after a probe, and so on. Storing a top level directory named after the blueprint, then a sub directory named after a probe, and so on may be referred to herein as a "namespace" specification of metrics. In this way, controller device 10 may map a query from administrator 12 to the same namespace specification.

Controller device 10 may determine one or more metrics for the query using the first set of configuration elements and the second set of configuration elements. For example, controller device 10 may identify one or more missing or unexpected configuration elements (e.g., routes or interfaces) based on a comparison of the first set of configuration elements determined using telemetry data and the second set of configuration elements determined using the intent mode. In this example, controller device 10 may determine one or more metrics (e.g., a state) for the query associated with the one or more missing or unexpected configuration elements. In some examples, controller device 10 may determine whether a missing route is overridden by another route. Controller device 10 may determine whether a missing route is improperly installed at an element of elements 14. Similarly, controller device 10 may determine whether an unexpected route is improperly installed at an element of elements 14. While the above examples are directed to routes, other examples may be directed to other configuration elements, such as, for example, interfaces (see FIGS. 4, 5). Controller device 10 may generate data representing a user interface presenting one or more metrics at a first time for the query and at a second time that occurs before or after the first time. For example, controller device 10 may generate a table, datasheet, interactive dashboard, etc., illustrating the one or more metrics at the first time and at the second time. Controller device 10 may output the data representing the user interface. For example, controller device 10 may cause the data representing the user interface to output on a display for viewing by administrator 12. In this way, controller device 10 may help to identify metrics that are most likely to be relevant to administrator 12, which may help to reduce an amount of time that administrator 12 reviews metrics in response to an event (e.g., a network service event).

Figure 2:
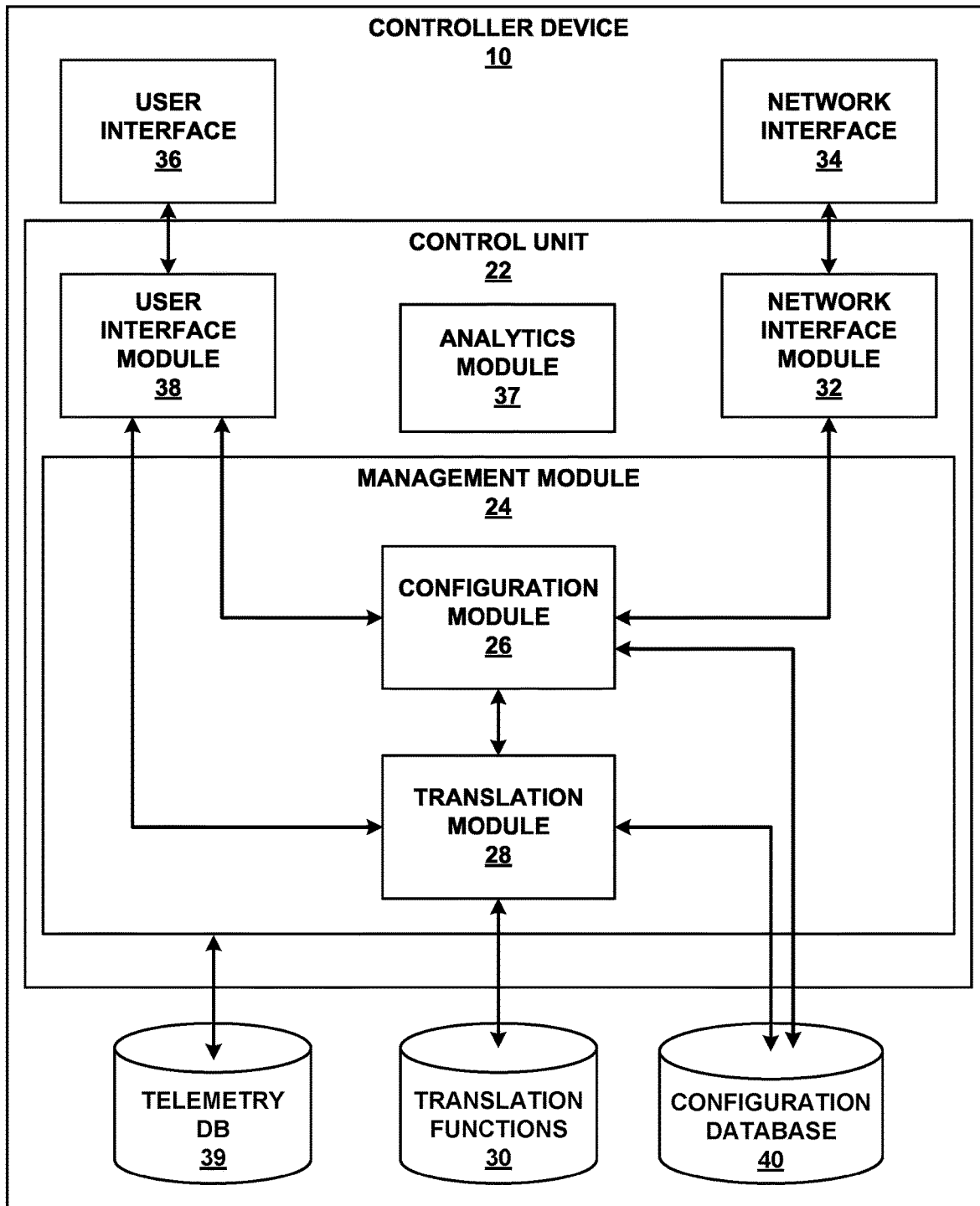
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 may include a data structure describing managed network devices, e.g., network elements 14. Configuration database 40 may act as an intent data store, which may be used to persist and manage collections of intent data models. For example, configuration database 40 may include information indicating device identifiers (such as MAC and/or IP addresses), device type, device vendor, devices species (e.g., router, switch, bridge, hub, etc.), or the like. Configuration database 40 may store current configuration information (e.g., intent data model, or in some cases, both intent data model and low-level configuration information) for the managed devices (e.g., network elements 14). Configuration database 40 may include a database that comprises a unified intent data model.

Management module 24 may maintain a data structure in configuration database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices. In some examples, network interface 34 may forward the high-level configuration instructions to the respective network devices (e.g., without translating the high-level configuration instructions to low-level configuration instructions).

Although user interface 36 is described for purposes of example of allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

In accordance with the techniques of the disclosure, analytics module 37 may be configured to identify relevant network configuration metrics (e.g., interface traffic, transceiver load, transceiver power, etc.) for an event (e.g., a service outage at a particular time) based on an intent model. For example, analytics module 37 may intelligently identify a subset of routes and/or interfaces that a network administrator is most likely to be interested in for a particular time and network service and the status of the subset of routes and/or interfaces. Analytics module 37 may provide a metric (e.g., a state) for each route and/or interface of the identified subset of routes and/or interfaces. Analytics module 37 may identify expected, non-expected extra routes, and/or missing routes or interfaces. In some examples, analytics module 37 may determine if those routes and/or interfaces are properly installed, missing or overridden by wrong routes on an element of elements 14. User interface module 38 may present a user interface that displays the relevant metrics to administrator 12. In this way, controller device 10 may identify metrics that are most likely to be relevant to the network administrator, which may help to reduce an amount of time that administrator 12 reviews metrics in response to an event (e.g., a network service event for network 2).

For example, user interface 36 may receive a query indicating a time and a network service from administrator 12. Analytics module 37 may determine a first set of configuration elements for the query using telemetry data stored in telemetry database (DB) 39 and associated with the time and the network service. For example, analytics module 37 may determine, using telemetry database 39, a first subset of routes impacted by the network service at the time from all routes of network 2. In some examples, analytics module 37 may determine a first subset of interfaces impacted by the network service at the time from all interfaces of network 2.

Analytics module 37 may determine a second set of configuration elements for the query using an intent model stored by configuration database 40. For example, analytics module 37 may determine, using the intent model stored by configuration database 40, a second subset of routes from all routes of network 2. In some instances, controller device 10 may determine, using the intent model stored by configuration database 40, a second subset of interfaces from all interfaces of network 2.

Analytics module 37 may determine one or more metrics for the query using the first set of configuration elements and the second set of configuration elements. For example, analytics module 37 may identify one or more missing or unexpected configuration elements (e.g., routes or interfaces) based on a comparison of the first set of configuration elements determined using telemetry data stored in telemetry database 39 and the second set of configuration elements determined using the intent model stored by configuration database 40. In this example, analytics module 37 may determine one or more metrics (e.g., a state) for the query associated with the one or more missing or unexpected configuration elements. In some examples, analytics module 37 may determine whether a missing route is overridden by another route. Analytics module 37 may determine whether a missing route is improperly installed at an element of elements 14. Similarly, analytics module 37 may determine whether an unexpected route is improperly installed at an element of elements 14. While the above examples are directed to routes, other examples may be directed to other configuration elements, such as, for example, interfaces (see FIGS. 4, 5).

User interface module 38 may generate data representing a user interface presenting the one or more metrics. For example, user interface module 38 may generate a table, datasheet, interactive dashboard, etc., illustrating the one or more metrics. Network interface module 32 may cause network interface 34 to output the data representing the user interface. For example, user interface module 38, with network interface module 32 and network interface 34, may cause the data representing the user interface to output on a display for viewing by administrator 12. In this way, controller device 10 may help to identify metrics that are most likely to be relevant to administrator 12, which may help to reduce an amount of time that administrator 12 reviews metrics in response to an event (e.g., a network service event).

Figure 3:
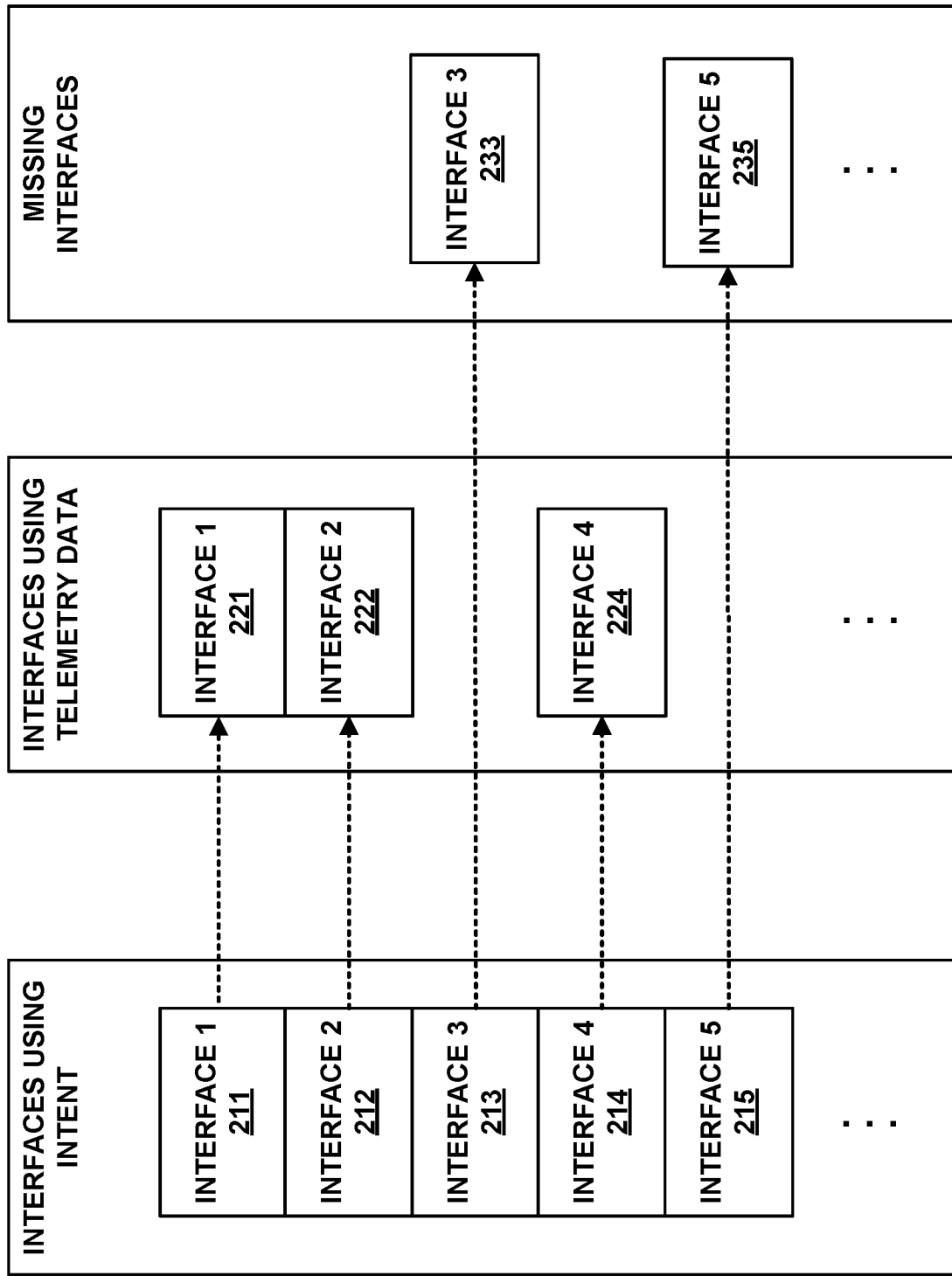
FIG. 3 is a conceptual diagram illustrating an example of determining metrics for missing interfaces using the management device of FIG. 1.

FIG. 3 is a conceptual diagram illustrating an example of determining metrics for missing interfaces using the management device of FIG. 1. FIG. 3 is discussed with FIGS. 1-2 for example purposes only. While the example of FIG. 3 illustrates 5 interfaces, other examples may include fewer than 4 interfaces and more than 5 interfaces.

In the example of FIG. 3, analytics module 37 may determine interfaces 221, 222, 224 for a query using telemetry data stored in telemetry database 39 that is associated with a time and a network service indicated in a query. For example, analytics module 37 may determine interfaces 221, 222, 224 are associated with a set of telemetry data stored in telemetry database 39 in response to determining that the set of telemetry data was detected by sensor devices for elements 14 at a time specified in the query and related to implementing a network service specified in the query. For example, analytics module 37 may map interfaces 221, 222, 224 to the query using the same namespace specification used to store telemetry data (e.g., time series data) in telemetry database 39.

Analytics module 37 may determine interfaces 211-215 for a query using an intent model stored in configuration database 40. For example, analytics module 37 may determine interfaces 211-215 for the query in response to determining that the intent model indicates that interfaces 211-215 were configured to implement the network service indicated in the query during the time indicated in the query. In this example, analytics module 37 may determine missing interfaces 233, 235 that are included in interfaces 211-215 (e.g., the second set of interfaces) and not included in interfaces 221, 222, 224 (e.g., the first set of interfaces). Analytics module 37 may determine a metric for missing interface 233. For example, analytics module 37 may determine a state (e.g., up or down) for missing interface 233.

In some examples, analytics module 37 may determine an indication of whether missing interface 233 is overridden by another interface. For example, analytics module 37 may determine that missing interface 233 was overridden by interface 224. In this example, analytics module 37 may generate a metric that indicates missing interface 233 has been overridden by interface 224.

In some examples, analytics module 37 may determine an indication of whether missing interface 233 was improperly installed at an element of elements 14. For example, analytics module 37 may determine that missing interface 233 was improperly installed at element 14A. In this example, analytics module 37 may generate a metric that indicates missing interface 233 was improperly installed at element 14A.

Figure 4:
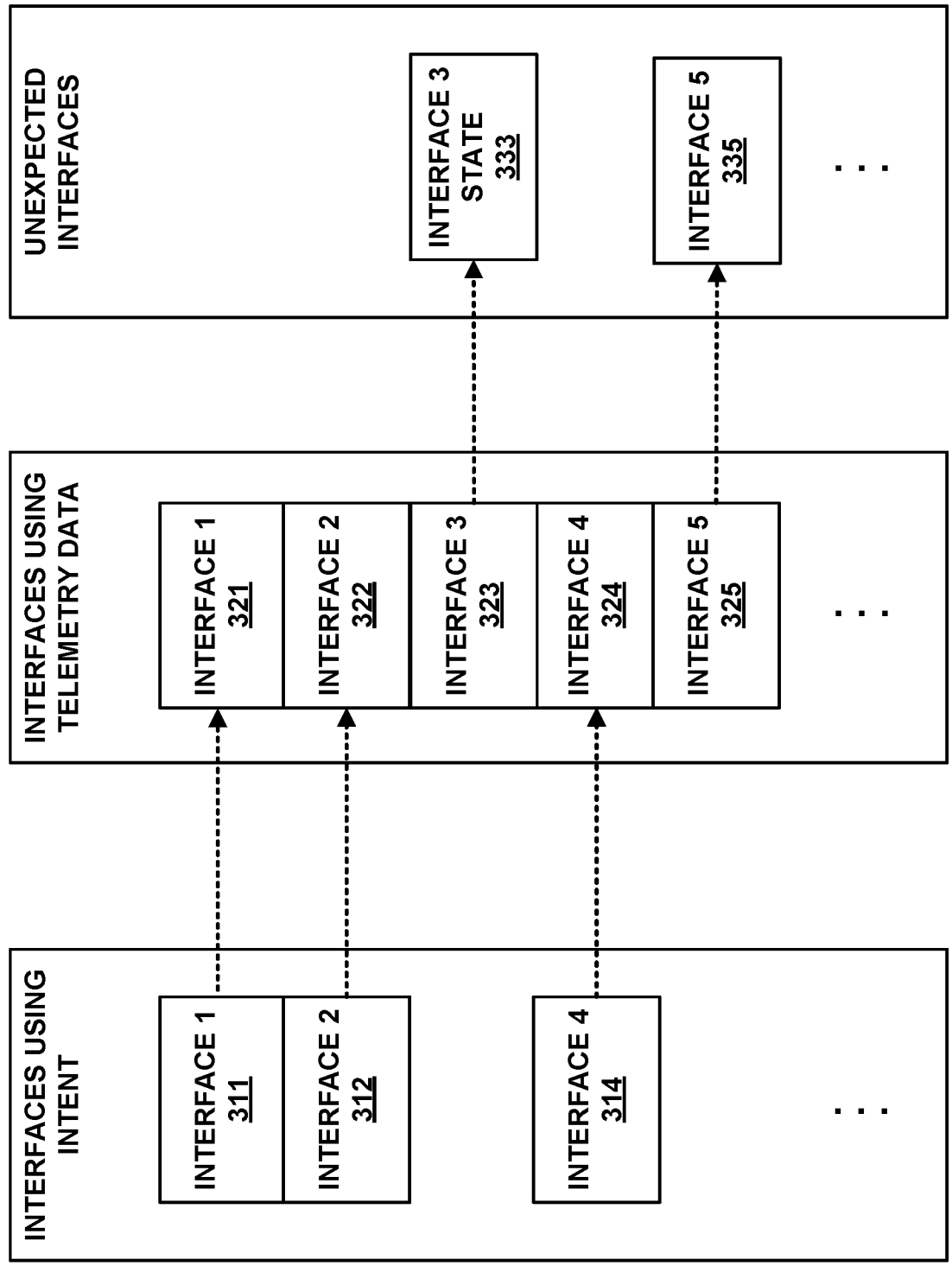
FIG. 4 is a conceptual diagram illustrating an example of determining metrics for unexpected interfaces using the management device of FIG. 1.

FIG. 4 is a conceptual diagram illustrating an example of determining metrics for unexpected interfaces using the management device of FIG. 1. FIG. 4 is discussed with FIGS. 1-3 for example purposes only. While the example of FIG. 4 illustrates 5 interfaces, other examples may include fewer than 4 interfaces and more than 5 interfaces.

In the example of FIG. 4, analytics module 37 may determine interfaces 321-325 for a query using telemetry data stored in telemetry database 39 that is associated with a time and a network service indicated in a query. For example, analytics module 37 may determine interfaces 321-325 are associated with a set of telemetry data stored in telemetry database 39 in response to determining that the set of telemetry data was detected by sensor devices for elements 14 at a time specified in the query and related to implementing a network service specified in the query.

Analytics module 37 may determine interfaces 311, 312, 314 for a query using an intent model stored in configuration database 40. For example, analytics module 37 may determine interfaces 311, 312, 314 for the query in response to determining that the intent model indicates that interfaces 311, 312, 314 were configured to implement the network service indicated in the query during the time indicated in the query. In this example, analytics module 37 may determine unexpected interfaces 333, 335 that are included in interfaces 321-325 (e.g., the first set of interfaces) and not included in interfaces 311, 312, 314 (e.g., the second set of interfaces). Analytics module 37 may determine a metric for unexpected interface 333. For example, analytics module 37 may determine a state (e.g., up or down) for unexpected interface 333. An example metric for unexpected interface 333 may include an optical transceiver operational state, e.g. temperature, voltage, current drawn, etc. In this case, interface 333 may not be utilized in the blueprint design (as indicated by the intent model), but may be equipped with an optical transceiver. A device collector may report a state of the device collector to controller device 10 which in turn saves the data to a time series database (e.g., telemetry database 39).

In some examples, analytics module 37 may determine an indication of whether unexpected interface 333 was improperly installed at an element of elements 14. For example, analytics module 37 may determine that unexpected interface 333 was improperly installed at element 14A. In this example, analytics module 37 may generate a metric that indicates unexpected interface 333 was improperly installed at element 14A.

Figure 5:
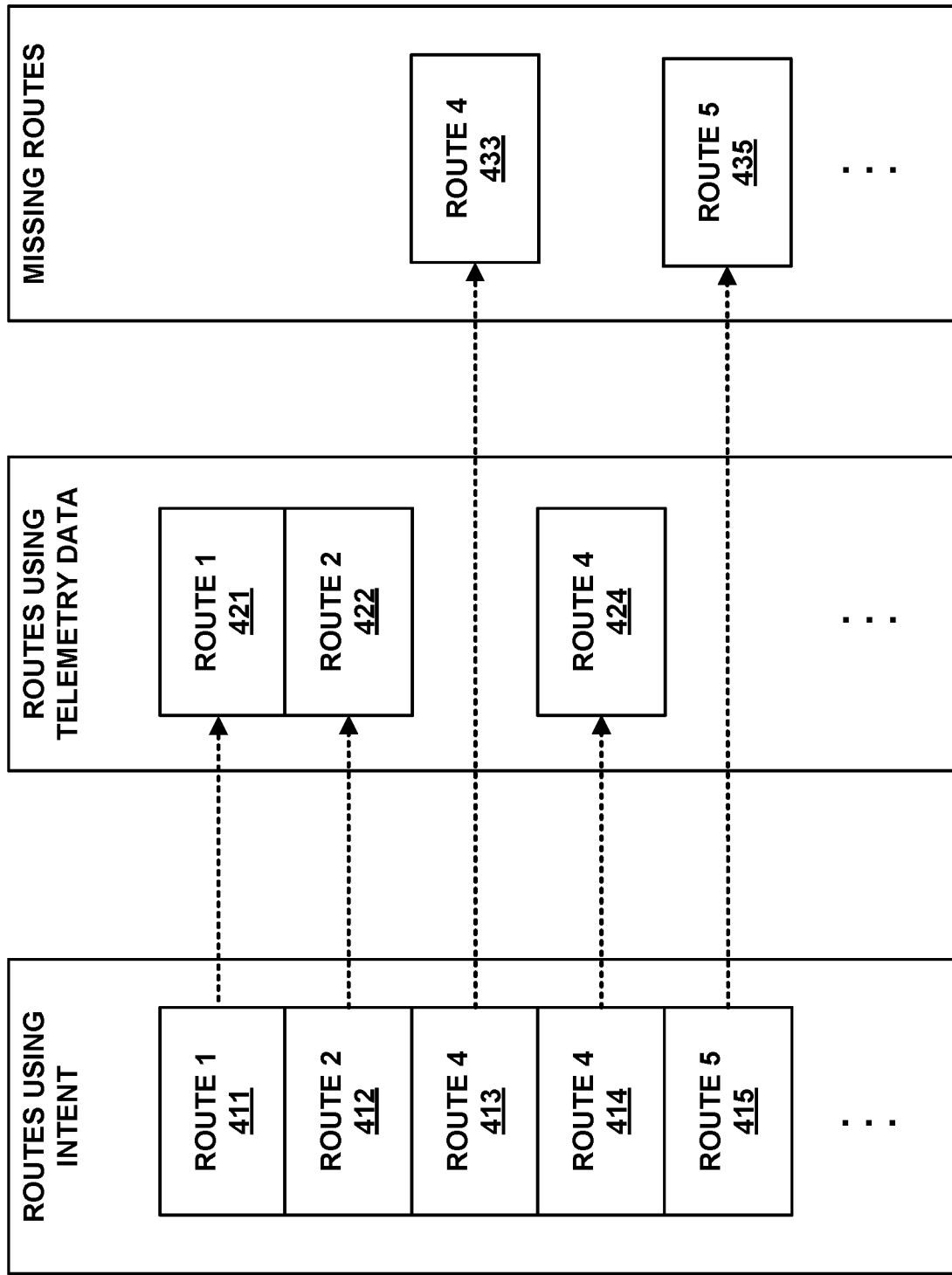
FIG. 5 is a conceptual diagram illustrating an example of determining metrics for missing routes using the management device of FIG. 1.

FIG. 5 is a conceptual diagram illustrating an example of determining metrics for missing routes using the management device of FIG. 1. FIG. 5 is discussed with FIGS. 1-4 for example purposes only. While the example of FIG. 5 illustrates 5 routes, other examples may include fewer than 4 routes and more than 5 routes.

In the example of FIG. 5, analytics module 37 may determine routes 421, 422, 424 for a query using telemetry data stored in telemetry database 39 that is associated with a time and a network service indicated in a query. For example, analytics module 37 may determine routes 421, 422, 424 are associated with a set of telemetry data stored in telemetry database 39 in response to determining that the set of telemetry data was detected by sensor devices for elements 14 at a time specified in the query and related to implementing a network service specified in the query.

Analytics module 37 may determine routes 411-415 for a query using an intent model stored in configuration database 40. For example, analytics module 37 may determine routes 411-415 for the query in response to determining that the intent model indicates that routes 411-415 were configured to implement the network service indicated in the query during the time indicated in the query. In this example, analytics module 37 may determine missing routes 433, 435 that are included in routes 411-415 (e.g., a second set of routes) and not included in routes 421, 422, 424 (e.g., the first set of routes). Analytics module 37 may determine a metric for missing route 433. For example, analytics module 37 may track how long a route stays "missing". Analytics module 37 may aggregate a missing route on a per-system per-network base. For example, analytics module 37 may output to administrator 12 an indication that "leaf-1 is missing 5 routes in virtual network 10000."

In some examples, analytics module 37 may determine an indication of whether route 433 is overridden by another route. For example, analytics module 37 may determine that missing route 433 was overridden by route 424. In this example, analytics module 37 may generate a metric that indicates missing route 433 has been overridden by route 424.

In some examples, analytics module 37 may determine an indication of whether missing route 433 was improperly installed at an element of elements 14. For example, analytics module 37 may determine that missing route 433 was improperly installed at element 14A. In this example, analytics module 37 may generate a metric that indicates missing route 433 was improperly installed at element 14A.

Figure 6:
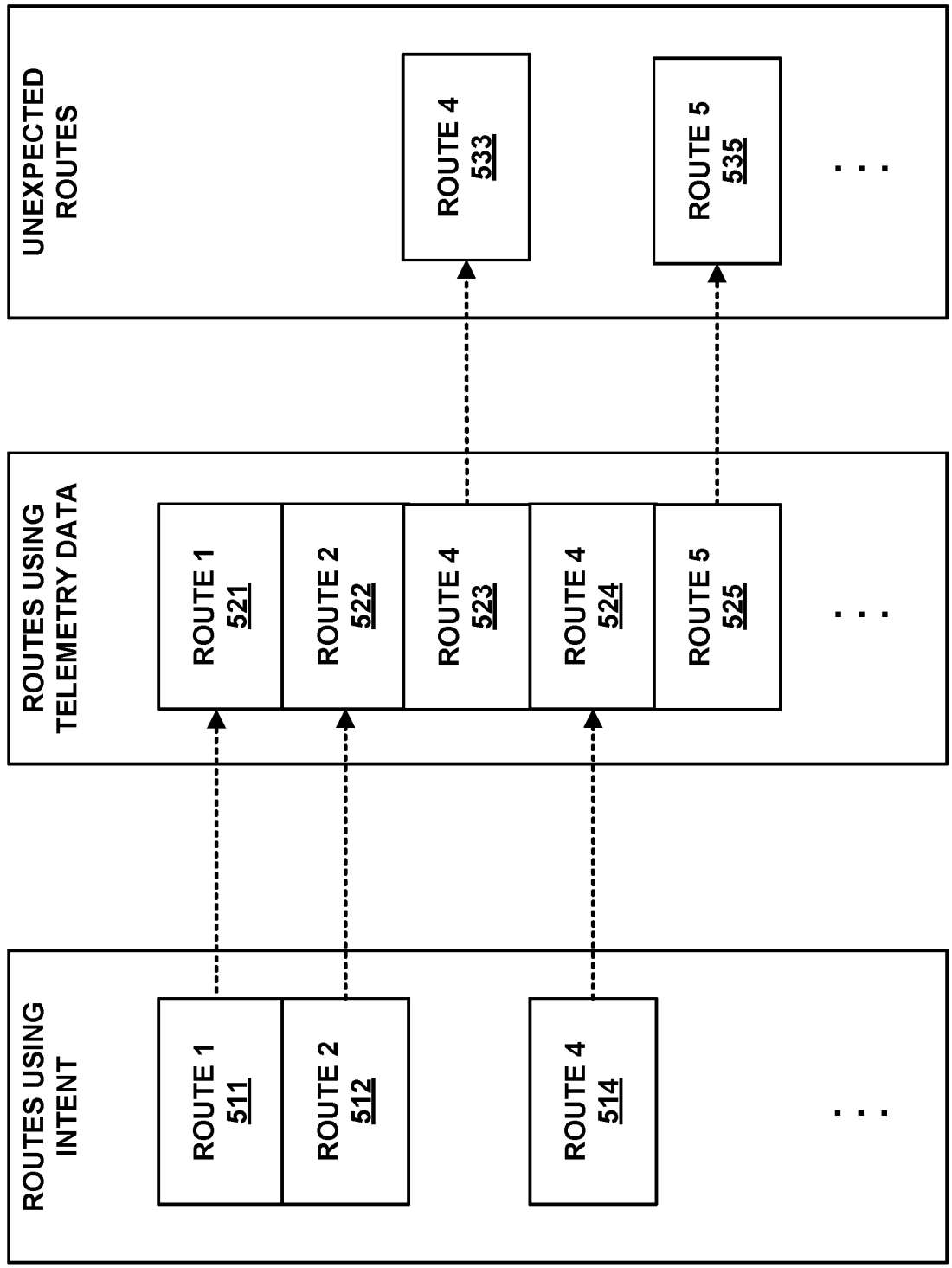
FIG. 6 is a conceptual diagram illustrating an example of determining metrics for unexpected routes using the management device of FIG. 1.

FIG. 6 is a conceptual diagram illustrating an example of determining metrics for unexpected routes using the management device of FIG. 1. FIG. 6 is discussed with FIGS. 1-5 for example purposes only. While the example of FIG. 6 illustrates 5 routes, other examples may include fewer than 4 routes and more than 5 routes.

In the example of FIG. 6, analytics module 37 may determine routes 521-525 for a query using telemetry data stored in telemetry database 39 that is associated with a time and a network service indicated in a query. For example, analytics module 37 may determine routes 521-525 are associated with a set of telemetry data stored in telemetry database 39 in response to determining that the set of telemetry data was detected by sensor devices for elements 14 at a time specified in the query and related to implementing a network service specified in the query.

Analytics module 37 may determine routes 511, 512, 514 for a query using an intent model stored in configuration database 40. For example, analytics module 37 may determine routes 511, 512, 514 for the query in response to determining that the intent model indicates that routes 511, 512, 514 were configured to implement the network service indicated in the query during the time indicated in the query. In this example, analytics module 37 may determine unexpected routes 533, 535 that are included in routes 521-525 (e.g., the first set of routes) and not included in routes 511, 512, 514 (e.g., the second set of routes). Analytics module 37 may determine a metric for unexpected route 533. For example, analytics module 37 may determine a route address for unexpected route 533.

In some examples, analytics module 37 may determine an indication of whether unexpected route 533 was improperly installed at an element of elements 14. For example, analytics module 37 may determine that unexpected route 533 was improperly installed at element 14A. In this example, analytics module 37 may generate a metric that indicates unexpected route 533 was improperly installed at element 14A.

Figure 7:
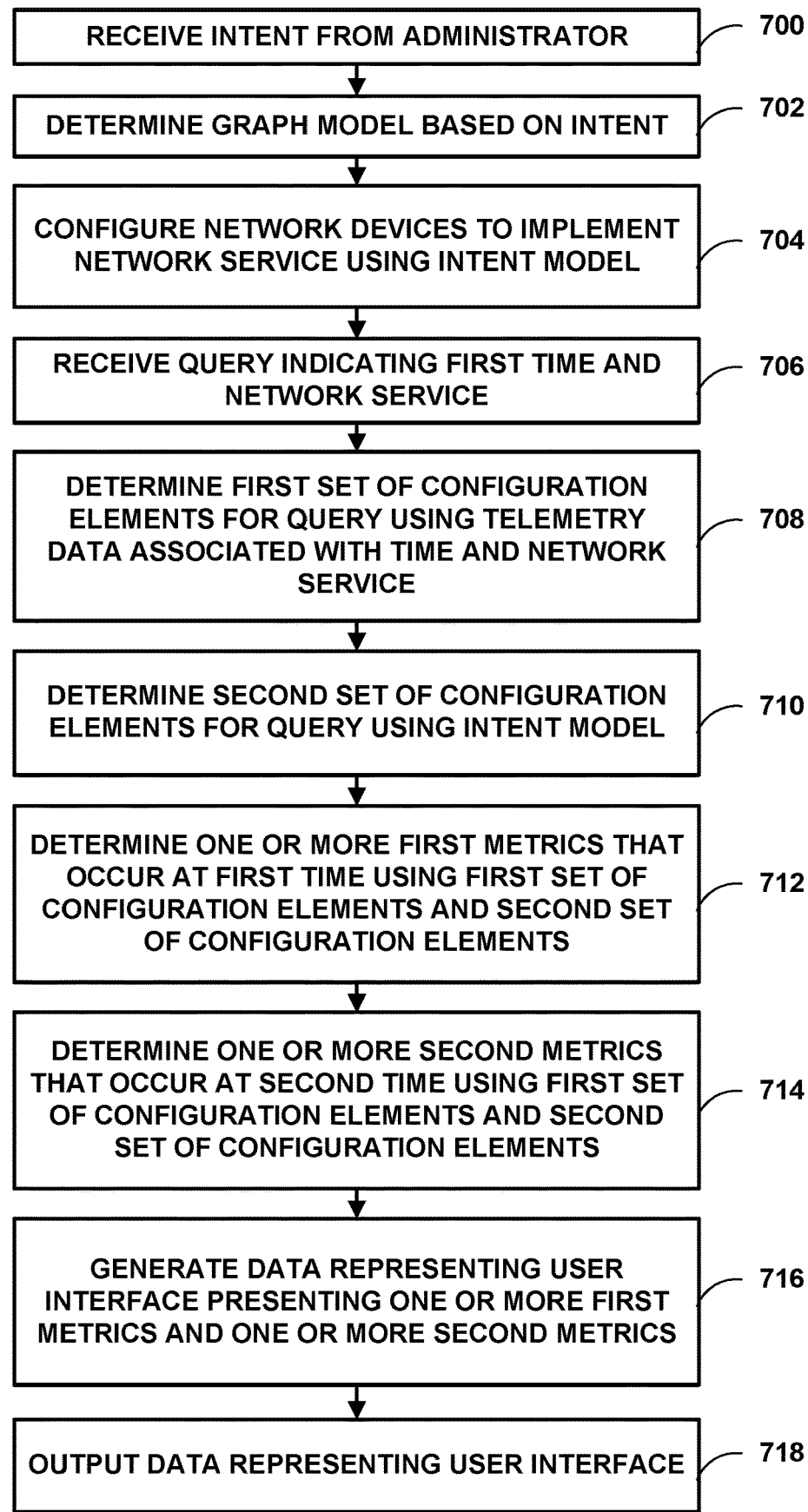
FIG. 7 is a flowchart illustrating an example process for determining one or more metrics from a database of telemetry data based on an intent model according to techniques of this disclosure.

FIG. 7 is a flowchart illustrating an example process for determining one or more metrics from a database of telemetry data based on an intent model according to techniques of this disclosure. FIG. 7 is discussed with FIGS. 1-6 for example purposes only.

Controller device 10 may receive an intent from administrator 12 (700). For example, controller device 10 may receive, from administrator 12, a set of declarative requirements expressing a desired configuration of network components of network 2 without specifying an exact native device configuration and control flow. Controller device 10 may determine a graph model based on the intent (702). For example, controller device 10 may model the received intent using as an intent model (e.g., a unified graph model), extending new intent support needs to extend the graph model and compilation logic. The intent model may include a plurality of vertices and a plurality of edges, each vertex of the plurality of vertices representing a respective network device of the plurality of network devices or a respective stateless intent of a plurality of stateless intents, and the plurality of edges defining relationships between the plurality of vertices.

Controller device 10 may configure network devices 14 to implement a network service using the intent model (704).

For example, controller device 10 may determine high-level configuration information for network device 14A using the intent model and cause network device 14 to configure a hardware or software network component (e.g., a route or an interface) using the intent high-level configuration information. For instance, controller device 10 may output the high-level configuration information to network device 14A and network device 14A (e.g., an agent operating at network device 14A) may be configured to translate the high-level configuration information into low-level device configuration information for network device 14A. In some instances, controller device 10 may translate the high-level configuration information into low-level device configuration information for network device 14A and output the low-level device configuration information to network device 14A.

Controller device 10 may receive a query indicating a first time and the network service (706). For example, controller device 10 may receive, from administrator 12, a query indicating a time and a network service implemented using the intent from step 700. Controller device 10 may determine a first set of configuration elements for the query using telemetry data associated with the time and the network service (708). For example, controller device 10 may determine, using telemetry data stored in telemetry database 39 that were detected by sensor devices at the first time specified in the query and related to the network service, a first set of routes for the query. In some examples, controller device 10 may determine, using telemetry data stored in telemetry database 39 that were detected by sensor devices at the time specified in the query and related to the network service, a first set of interfaces for the query.

Controller device 10 may determine a second set of configuration elements for the query using an intent model (710). For example, controller device 10 may determine, using an intent model stored in configuration database 40, a second set of routes for the query that implement the network service during the time specified in the query. In some examples, controller device 10 may determine, using an intent model stored in configuration database 40, a second set of interfaces for the query that implement the network service during the time specified in the query.

Controller device 10 may determine one or more first metrics that occur at the first time using the first set of configuration elements and the second set of configuration elements (712) and determine one or more second metrics at a second time using telemetry data received from the plurality of network devices (714). Determining one or more first metrics that occur at the first time and one or more second metrics that occur at the second time may help to identify metrics that are most likely to be relevant to administrator 12, which may help to reduce an amount of time that administrator 12 reviews metrics in response to an event (e.g., a network service event).

For example, controller device 10 may determine a missing interface that is included in the second set of interfaces and not included in the first set of interfaces (See FIG. 3). In this example, controller device 10 may determine a first metric at the first time and a second metric at the second time for the missing interface. The first time and the second time may be different. For example, the second time may occur before or after the first time. Controller device 10 may determine an indication of whether the missing interface is overridden by another interface and/or an indication of whether the missing interface is improperly installed at a network device of the plurality of network devices.

In some examples, controller device 10 may determine an unexpected interface that is included in the first set of interfaces and not included in the second set of interfaces (See FIG. 4). In this example, controller device 10 may determine a metric for the unexpected interface. Controller device 10 may determine an indication of whether the unexpected interface is improperly installed at a network device of network devices 14.

Controller device 10 may determine a missing route that is included in the second set of routes and not included in the first set of routes (See FIG. 5). In this example, controller device 10 may determine a metric for the missing route. Controller device 10 may determine an indication of whether the missing route is overridden by another interface and/or an indication of whether the missing route is improperly installed at a network device of network devices 14.

In some examples, controller device 10 may determine an unexpected route that is included in the first set of routes and not included in the second set of routes (See FIG. 6). In this example, controller device 10 may determine a metric for the unexpected route. Controller device 10 may determine an indication of whether the unexpected route is improperly installed at a network device of network devices 14.

Controller device 10 may generate data representing a user interface presenting the one or more first metrics and the one or more second metrics (716). For example, controller device 10 may generate a dashboard displaying the one or more metrics for expected routes, unexpected extra routes, and missing routes. Controller device 10 may output the data representing the user interface (718). For example, controller device 10 may cause the data representing the user interface to output on a display for viewing by administrator 12.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method of managing a plurality of network devices, the method comprising:
    receiving, by one or more processors of a device that manages the plurality of network devices, a query indicating a first time and a network service;
    determining, by the one or more processors, a first set of configuration elements of the plurality of network devices using telemetry data received from the plurality of network devices and associated with the first time and the network service;
    determining, by the one or more processors, a second set of configuration elements of the plurality of network devices using an intent model;
    determining, by the one or more processors, one or more first metrics that occur at the first time using the first set of configuration elements and the second set of configuration elements;
    determining, by the one or more processors, one or more second metrics at a second time using telemetry data received from the plurality of network devices;
    generating, by the one or more processors, data representing a user interface presenting the one or more first metrics and the one or more second metrics; and
    outputting, by the one or more processors, the data representing the user interface.

2. The method of claim 1, wherein the intent model comprises a plurality of vertices and a plurality of edges, each vertex of the plurality of vertices representing a respective network device of the plurality of network devices or a respective stateless intent of a plurality of stateless intents, and the plurality of edges defining relationships between the plurality of vertices.

3. The method of claim 1,
    wherein determining the first set of configuration elements comprises determining a first set of routes; and
    wherein determining the second set of configuration elements comprises determining a second set of routes.

4. The method of claim 3, further comprising determining a missing route that is included in the second set of routes and not included in the first set of routes, wherein determining the one or more first metrics comprises determining a metric for the missing route.

5. The method of claim 4, wherein determining the metric comprises determining an indication of whether the missing route is overridden by another route.

6. The method of claim 4, wherein determining the metric comprises determining an indication of whether the missing route is improperly installed at a network device of the plurality of network devices.

7. The method of claim 3, further comprising determining an unexpected route that is included in the first set of routes and not included in the second set of routes, wherein determining the one or more first metrics comprises determining a metric for the unexpected route.

8. The method of claim 7, wherein determining the metric comprises determining an indication of whether the unexpected route is improperly installed at a network device of the plurality of network devices.

9. The method of claim 1,
    wherein determining the first set of configuration elements comprises determining a first set of interfaces; and
    wherein determining the second set of configuration elements comprises determining a second set of interfaces.

10. The method of claim 9, further comprising determining a missing interface that is included in the second set of interfaces and not included in the first set of interfaces, wherein determining the one or first more metrics comprises determining a metric for the missing interface.

11. The method of claim 10, wherein determining the metric comprises determining an indication of whether the missing interface is overridden by another interface.

12. The method of claim 10, wherein determining the metric comprises determining an indication of whether the missing interface is improperly installed at a network device of the plurality of network devices.

13. The method of claim 9, further comprising determining an unexpected interface that is included in the first set of interfaces and not included in the second set of interfaces, wherein determining the one or more first metrics comprises determining a metric for the unexpected route.

14. The method of claim 13, wherein determining the metric comprises determining an indication of whether the unexpected interface is improperly installed at a network device of the plurality of network devices.

15. The method of claim 1, further comprising configuring, by the one or more processors, the plurality of network devices to implement the network service using the intent model.

16. The method of claim 15, wherein configuring the plurality of network devices comprises:
    determining high-level configuration information for a network device using the intent model; and
    causing the network device to configure using the intent high-level configuration information.

17. The method of claim 16,
    wherein causing the network device to configure comprises outputting the high-level configuration information to the network device; and
    wherein the network device is configured to translate the high-level configuration information into low-level device configuration information for the network device.

18. The method of claim 16, wherein causing the network device to configure comprises:
    translating the high-level configuration information into low-level device configuration information for the network device; and
    outputting the low-level configuration information to the network device.

19. A controller device comprising:
    a memory; and
    one or more processors coupled to the memory;
    wherein the memory stores instructions that, when executed, cause the one or more processors to:
        receive a query indicating a first time and a network service;
        determine a first set of configuration elements of a plurality of network devices using telemetry data received from the plurality of network devices and associated with the first time and the network service;

determine a second set of configuration elements of the plurality of network devices using an intent model;

determine one or more first metrics that occur at the first time using the first set of configuration elements and the second set of configuration elements;

determine one or more second metrics at a second time using telemetry data received from the plurality of network devices;

generate data representing a user interface presenting the one or more first metrics and the one or more second metrics; and output the data representing the user interface.

20. A computer-readable storage medium having stored thereon instructions that, when executed, cause a processor of a controller device that manages a plurality of network devices to:

receive a query indicating a first time and a network service;

determine a first set of configuration elements of the plurality of network devices using telemetry data received from the plurality of network devices and associated with the first time and the network service;

determine a second set of configuration elements of the plurality of network devices using an intent model;

determine one or more first metrics that occur at the first time using the first set of configuration elements and the second set of configuration elements;

determine one or more second metrics at a second time using telemetry data received from the plurality of network devices;

generate data representing a user interface presenting the one or more first metrics and the one or more second metrics; and output the data representing the user interface.

* * * * *

UNITED STATES PATENT AND TRADEMARK OFFICE
CERTIFICATE OF CORRECTION

| | |
|---|---|
| PATENT NO. | : 11,582,099 B1 |
| APPLICATION NO. | : 17/657519 |
| DATED | : February 14, 2023 |
| INVENTOR(S) | : Diheng Qu et al. |

It is certified that error appears in the above-identified patent and that said Letters Patent is hereby corrected as shown below:

In the Claims

Column 20, Line 29 (Claim 13): replace "determining a metric for the unexpected route." with --determining a metric for the unexpected interface.--

Signed and Sealed this
Twenty-first Day of November, 2023

Katherine Kelly Vidal
*Director of the United States Patent and Trademark Office*